(12) United States Patent
Ryu

(10) Patent No.: US 7,283,195 B2
(45) Date of Patent: Oct. 16, 2007

(54) METHOD OF FABRICATING COLOR FILTER SUBSTRATE FOR LIQUID CRYSTAL DISPLAY DEVICE HAVING PATTERNED SPACERS

(75) Inventor: Sang-Chul Ryu, Gyeongsangbuk-do (KR)

(73) Assignee: LG.Philips LCD Co., Ltd., Seoul (KR)

(*) Notice: Subject to any disclaimer, the term of this patent is extended or adjusted under 35 U.S.C. 154(b) by 348 days.

(21) Appl. No.: 11/000,891

(22) Filed: Dec. 2, 2004

(65) Prior Publication Data

US 2005/0243266 A1    Nov. 3, 2005

(30) Foreign Application Priority Data

Apr. 30, 2004    (KR)    ............... 10-2004-0030591

(51) Int. Cl.
*G02F 1/1339*    (2006.01)

(52) U.S. Cl. ............... 349/156; 349/155; 156/230; 503/227

(58) Field of Classification Search ........ 349/155–156; 156/230; 503/227
See application file for complete search history.

(56) References Cited

U.S. PATENT DOCUMENTS

| | | | |
|---|---|---|---|
| 5,710,097 A * | 1/1998 | Staral et al. ............. | 503/227 |
| 6,312,546 B1 * | 11/2001 | Bannister et al. .......... | 156/230 |
| 6,646,709 B2 * | 11/2003 | Matsumoto ............. | 349/156 |
| 6,812,990 B1 * | 11/2004 | Hofmann et al. ......... | 349/156 |
| 6,951,494 B2 * | 10/2005 | Noma et al. ............. | 445/24 |
| 2002/0167635 A1 | 11/2002 | Yi | |
| 2004/0027529 A1 | 2/2004 | Sasaki | |
| 2005/0068487 A1 * | 3/2005 | Hsieh et al. ............. | 349/155 |

\* cited by examiner

*Primary Examiner*—Huyen Ngo
(74) *Attorney, Agent, or Firm*—Morgan, Lewis & Bockius LLP

(57) ABSTRACT

A method of fabricating a liquid crystal display device including a liquid crystal layer between a first substrate and a second substrate includes attaching a transfer film onto a surface of one of the substrates, the surface facing the liquid crystal layer, the transfer film including a transfer material layer contacting the surface; transferring portions of the transfer material layer to the surface; and removing the transfer film except the transferred portions of the transfer material layer to form patterned spacers.

17 Claims, 16 Drawing Sheets backlight

METHOD OF FABRICATING COLOR FILTER SUBSTRATE FOR LIQUID CRYSTAL DISPLAY DEVICE HAVING PATTERNED SPACERS

The present invention claims the benefit of Korean Patent Application No. 2004-30591, filed in Korea on Apr. 30, 2004, which is hereby incorporated by reference.

BACKGROUND OF THE INVENTION

1. Field of the Invention

The present invention relates to a method of fabricating a color filter substrate for a liquid crystal display (LCD) device, and more particularly, to a method of fabricating a color filter substrate having patterned spacers.

2. Discussion of the Related Art

In general, a liquid crystal display (LCD) device makes use of optical anisotropy and polarization properties of liquid crystal molecules. The liquid crystal molecules have a definite orientational alignment that results from their long thin shape. The orientation of the liquid crystal molecules can be controlled by applying an electric field to the liquid crystal molecules. The orientation of the liquid crystal molecules changes in accordance with an intensity of the applied electric field. Incident light through a liquid crystal material is refracted due to an orientation of the liquid crystal molecules. Thus, an intensity of the incident light can be controlled and images can be displayed.

Among the various types of LCD devices commonly used, active matrix LCD (AM-LCD) devices have been developed because of their high resolution and superior display of moving images. In an active matrix LCD (AM-LCD) device, thin film transistors (TFTs) and pixel electrodes connected to the TFTs are disposed in a matrix configuration.

The LCD device includes upper and lower substrates, and a liquid crystal layer interposed therebetween. The upper substrate and lower substrate are commonly referred to as a color filter substrate and an array substrate, respectively. A common electrode and color filter layers are formed on the upper substrate. TFTs and pixel electrodes are formed on the lower substrate. A seal pattern is provided at a periphery of one of the upper and lower substrates for bonding the upper and lower substrates to each other.

After forming the common electrode, the color filter layers, the TFTs and the pixel electrodes, the LCD device undergoes a liquid crystal cell process where a liquid crystal layer is formed between the upper and lower substrates. The liquid crystal cell process may be divided into a process of forming an alignment layer to align the liquid crystal molecules, a process of forming a cell gap, a process of attaching the color filter and array substrates together, a process of cutting the attached color filter and array substrates into cells, and a process of injecting the liquid crystal molecules. Accordingly, a liquid crystal display panel is fabricated using the liquid crystal cell process.

FIG. 1 is a perspective view of a related art liquid crystal display device. Referring to FIG. 1, a liquid crystal display device 1 includes first and second substrates 10 and 60 arranged facing each other. A liquid crystal layer 80 is interposed between the first and second substrates 10 and 60. A color filter layer 65 and a common electrode 70 are subsequently formed on an inner surface of the second substrate 60. An electric field is applied to the liquid crystal layer 80 through the common electrode 70. Although not shown, the color filter layer 65 includes red, green and blue filters for passing only light of a specific wavelength, and a black matrix. The black matrix is disposed in a boundary region of the color filters and shields light from a region in which alignment of the liquid crystal layer 80 is uncontrollable. An additional light source such as a backlight (not shown), for example, is mounted on the back of the first substrate 10.

A plurality of gate lines 15 and a plurality of data lines 20 are formed in a matrix array on an inner surface of the first substrate 10. A plurality of TFTs "Tr" are disposed at crossings of the gate lines 15 and data lines 20, and pixel electrodes 30 that are connected to the TFTs Tr are disposed at pixel regions P defined by crossings of the gate and data lines 15 and 20. A TFT "Tr" is a switching device.

Although not shown, the LCD device 1 requires internal spacers to maintain a cell gap defined by a thickness of the liquid crystal layer 80. However, since ball spacers are randomly distributed between the first and second substrates 10 and 60, the quality of an alignment layer may be lowered due to movement of the ball spacers. In addition, light leakage may occur within regions adjacent to the ball spacers due to an adsorption force between the liquid crystal molecules adjacent to the ball spacers. Moreover, a uniform cell gap may not be obtained in a large sized LCD device. Furthermore, since the ball spacers are elastic and do not remain at a fixed position, a severe ripple phenomenon may occur when the LCD device 1 is touched. Thus, superior display quality can not be obtained in the LCD device 1 when a uniform cell gap is maintained using ball spacers.

On the other hand, a uniform cell gap may be easily obtained using patterned spacers since they are formed in a non-pixel region, thereby preventing light leakage and improving contrast ratio. In addition, the patterned spacers may be applied to an LCD device to form a small cell gap since the patterned spacers can be controlled precisely. Furthermore, since the patterned spacers are fixed, they may be easily applied to large sized LCD devices and the ripple phenomenon may be prevented when the LCD device is touched. Since the patterned spacers may be formed directly on the overcoat layer in a case of omitting a common electrode from the color filter substrate such as in an IPS-mode LCD device, reliability of the patterned spacers is improved.

FIG. 2 is a schematic plan view showing an LCD device having patterned spacers according to the related art. FIG. 3 is a schematic cross section view along a line III-III of FIG. 2. Referring to FIG. 2, a plurality of gate lines 15 is formed on the first substrate 10 (shown in FIG. 1) along a first direction. The plurality of gate lines 15 includes gate electrodes 13. Data lines 20 a formed along a second direction crossing the gate lines 15 to define pixel regions P. Thin film transistors TFTs "Tr" are connected to the gate lines 15 and the data lines 20.

Referring to FIG. 3, a gate insulating layer 17 is formed on the gate electrodes 13. A semiconductor layer 19 is formed by subsequently depositing an active layer 19a and an ohmic contact layer 19b on the gate insulating layer 17 over the gate electrodes 13. Source and drain electrodes 23 and 25 are formed on the semiconductor layer 19 with a space between the source and drain electrodes 23 and 25, thereby forming a channel "ch" exposing the active layer 19a. The TFTs "Tr" include the gate electrodes 13, the semiconductor layer 19 and the source and drain electrodes 23 and 25.

Moreover, a passivation layer 27 is formed on the TFT "Tr", and a pixel electrode 30 is formed on the passivation layer 27. The passivation layer 27 has a plurality of drain contact holes 24 that expose a surface region of the drain electrode 25, and the pixel electrodes 30 contact the surface region of the drain electrode 25 through the plurality of drain contact holes 24 with the pixel region P.

A color filter layer 65 and a black matrix 62 are formed on an inner surface of the second substrate 60. The black matrix 62 includes a plurality of open portions 63 corresponding to the pixel regions P. A common electrode 70 is formed on the color filter layer 65 and the black matrix 62. Specifically, the color filter layer 65 includes red, green and blue color filters 65a, 65b and 65c. Each pixel region P includes one of red, green and blue color filters. The black matrix 62 is located in a boundary region of the pixel region P. Although not shown, the red, green and blue color filters 65a, 65b and 65c, respectively, are located in the open portions 63.

In order to improve image quality, the red, green and blue color filters 65a, 65b and 65c may overlap with edges of adjacent portion of the black matrix 62 as shown in FIG. 3. Although not shown, first and second alignment layers are formed on the pixel electrodes 30 and the common electrode 7, respectively, such that the liquid crystal layer 80 is formed between the first and second alignment layers.

Meanwhile, patterned spacers 85 are formed between the first and second substrates 10 and 60 to maintain a cell gap defined by a thickness of the liquid crystal layer 80. The patterned spacers 85 are spaced apart from each other, preferably, with a same interval. For example, the patterned spacers 85 are located in a periphery region of the pixel regions P. The patterned spacer 85 may be located in regions corresponding to portions of the gate lines 15 as shown in FIG. 3.

The patterned spacers 85 may be formed on the first substrate 10 or on the second substrate 60. However, since the second substrate 60 having the color filter layer 65 has a better flatness and a simpler structure than the first substrate 10, which includes an array element layer (not shown), the patterned spacers 85 are generally formed on the second substrate 60 having the color filter layer 65 in order to stabilize its position.

FIGS. 4A to 4G are schematic cross section views illustrating a fabricating process of a color filter substrate for an LCD device having patterned spacers according to the related art. Referring to FIG. 4A, a black matrix 62 is formed by coating (or depositing) a light blocking material on the second substrate 60 including the plurality of pixel regions P shown in FIG. 2. The black matrix 62 is located in a boundary of the pixel regions P in order to prevent leakage and to shield the TFT "Tr" (shown in FIG. 2) from incident light.

The black matrix 62 is formed by a photolithography process which may include steps of exposing and developing and may use a photoresist and a mask having a transmissive portion and a shielding portion. When the black matrix 62 is made of a photosensitive material, no photoresist is required in the photolithography process. However, when the black matrix 62 is made of a metal containing a chromium (Cr) as a basic material, a photo-resist is required in the photolithography process. The black matrix 62 includes first to third open portions 63a, 63b and 63c, which expose portions of the second substrate 60, respectively. Each of the first to third open portions 63a, 63b and 63c corresponds each of the pixel regions P.

Referring to FIG. 4B, a red resist layer 64 is formed by spin coating or bar coating a red resist material over an entire surface of the second substrate 60 including the black matrix 62. Next, a mask 90 having a transmissive portion tp1 and a shielding portion sp1 is disposed over the second substrate 60. Then, the red resist layer 64 of the second substrate 60 is exposed by an ultraviolet (UV) light through the mask 90. For example, the red resist layer 64 may be a negative type material so that an exposed portion of the resist layer 64 is patterned into a desired pattern. Thus the transmissive portion tp1 of the mask 90 corresponds to the first open portion 63a in which a red color filter will be formed.

Referring to FIG. 4C, the exposed portion of the red resist layer 64 shown in FIG. 4B is patterned into a red color filter 65a. Although not shown, the red color filter 65a is completed by sequentially developing and curing after the step of exposing. The red color filter 65a is formed in the first open portion 63a of the black matrix 62. Furthermore, the red color filter 65a overlaps the edge of an adjacent black matrix 62 as shown in FIG. 4C.

Referring to FIG. 4D, green and blue sub color filters 65b and 65c are formed by patterning. The patterning includes sequentially coating, exposing and developing green and blue resist materials over the second substrate 60 having the red color filter 65a, respectively. The green and blue color filters 65b and 65c are located in the second and third open portions 63b and 63c, respectively. The red, green and blue color filters 65a, 65b and 65c constitute a color filter layer 65.

Referring to FIG. 4E, a common electrode 70 is formed on an entire surface of the color filter layer 65 and the black matrix 62 over the second substrate 60. For example, the common electrode 70 may be made of a transparent conductive material such as one of indium tin oxide (ITO), indium zinc oxide (IZO) and indium tin zinc oxide (ITZO).

Although not shown, when both of the common electrodes 70 and the pixel electrodes 30 shown in FIG. 3 are formed on the first substrate or array substrate 10, the common electrodes 70 is omitted from the second substrate or the color filter substrate 60. Also not shown, an overcoat layer may be formed between the color filter layer 65 and the common electrode 70 to improve planarization properties of the second substrate 60. In general, when the black matrix 62 is made of an organic material, the overcoat layer is formed on the second substrate 60.

Referring to FIG. 4F, a spacer material layer 84 is formed by coating a photosensitive organic material on the common electrode 70 over the second substrate 60. The photosensitive organic material includes a colorless transparent material. A mask 93 including a shielding portion sp2 and a transmissive portion tp2 is disposed over the second substrate 60 having the spacer material layer 84. The transmissive portion tp2 of the mask 93 is located at a boundary region of the shielding portion sp2. The spacer material layer 84 of the second substrate 60 is exposed by UV light through the mask 93. For example, the spacer material layer 84 is a negative type material having the same exposing property as the color filter layer 65.

Referring to FIG. 4G, following the developing process, only the exposed portion of the spacer material layer 84 corresponding to the transmissive portion tp2 of the mask 93 remains as shown in FIG. 4F. The remaining portion of the spacer material layer 84 shown in FIG. 4F acts as a patterned spacer 85. The patterned spacer 85 is located in a portion corresponding to the black matrix 62 as shown in FIG. 4G.

The fabricating method of the color filter substrate for the LCD device according to the related art requires at least five mask processes or photolithography processes for forming the black matrix, the red, green and blue color filters, and the patterned spacer. In these mask processes, a mask used in the mask processes is very expensive. In addition, since the number of mask processes is proportional to the number of masks, a large number of mask processes increases a production cost of the color filter substrate.

SUMMARY OF THE INVENTION

Accordingly, the present invention is directed to a method of fabricating an LCD device having patterned spacers that substantially obviates one or more of the problems due to limitations and disadvantages of the related art.

An object of the present invention is to provide a method of fabricating a color filter substrate for an LCD device having patterned spacers using a reduced number of masks.

To achieve these and other advantages and in accordance with the purpose of the present invention, as embodied and broadly described, a method of fabricating a liquid crystal display device including a liquid crystal layer between a first substrate and a second substrate includes attaching a transfer film onto a surface of one of the substrates, the surface facing the liquid crystal layer, the transfer film including a transfer material layer contacting the surface; transferring portions of the transfer material layer to the surface; and removing the transfer film except the transferred portions of the transfer material layer to form patterned spacers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, examples of which are illustrated in the accompanying drawings.

Figure 1:
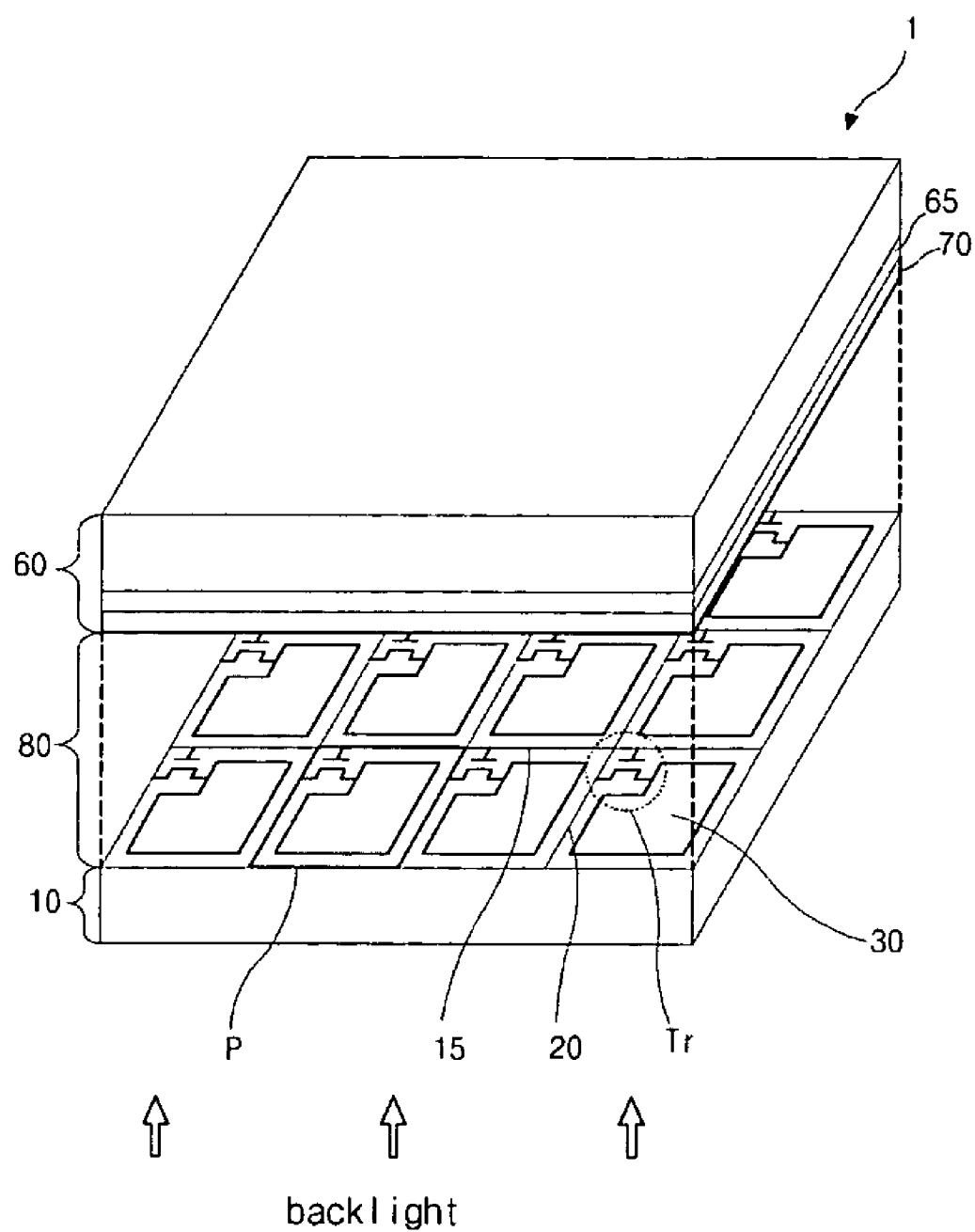
FIG. 1 is a perspective view of a related art liquid crystal display device.
Figure 2:
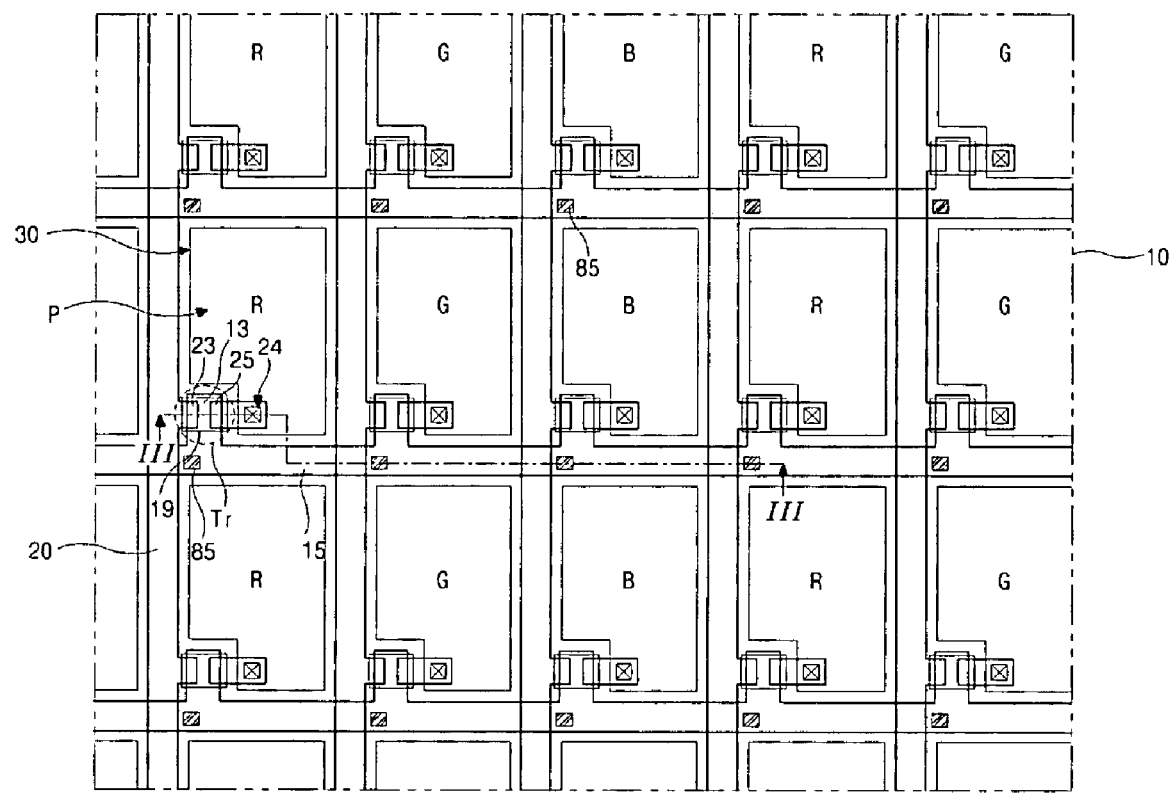
FIG. 2 is a schematic plan view showing an LCD device having patterned spacers according to the related art.
Figure 3:
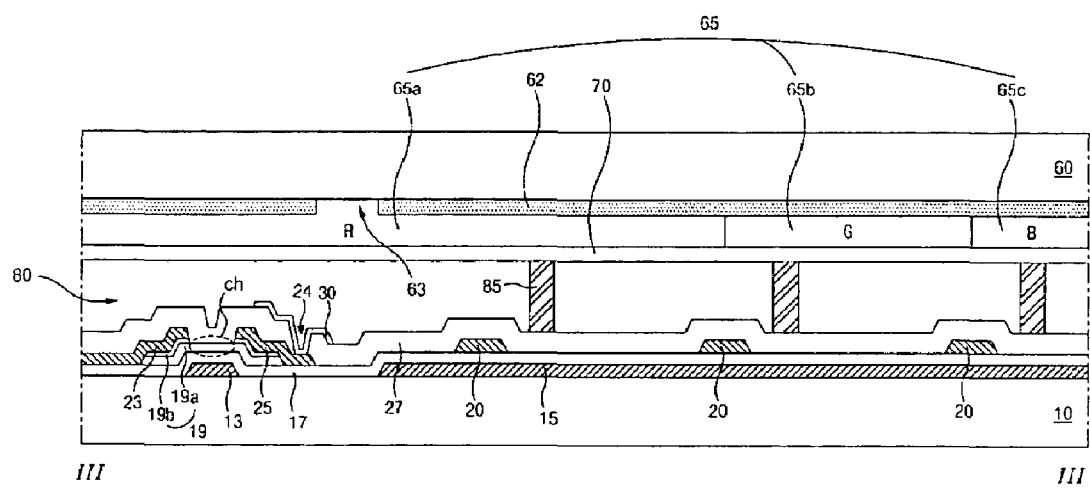
FIG. 3 is a schematic cross section view along a line III-III of FIG. 2.
Figure 4A:
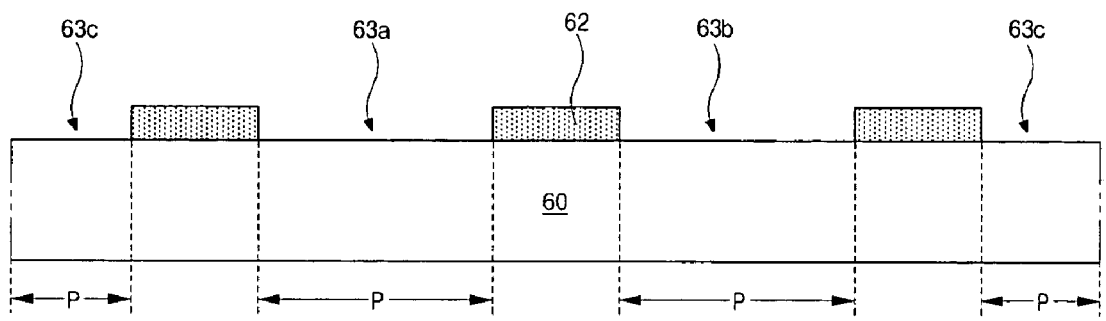
FIGS. 4A to 4G are schematic cross section views illustrating a fabricating process of a color filter substrate for an LCD device having patterned spacers according to the related art.
Figure 4B:
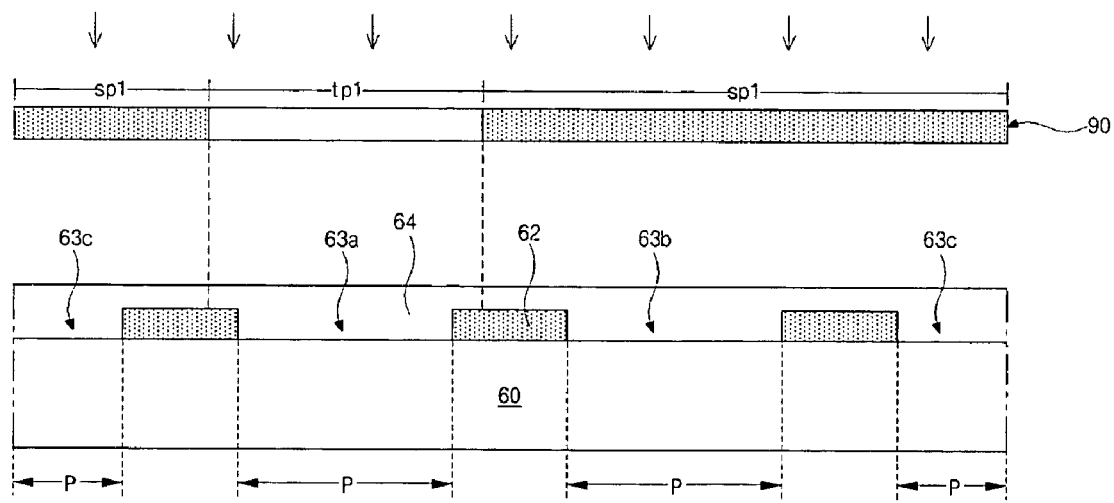
Figure 4C:
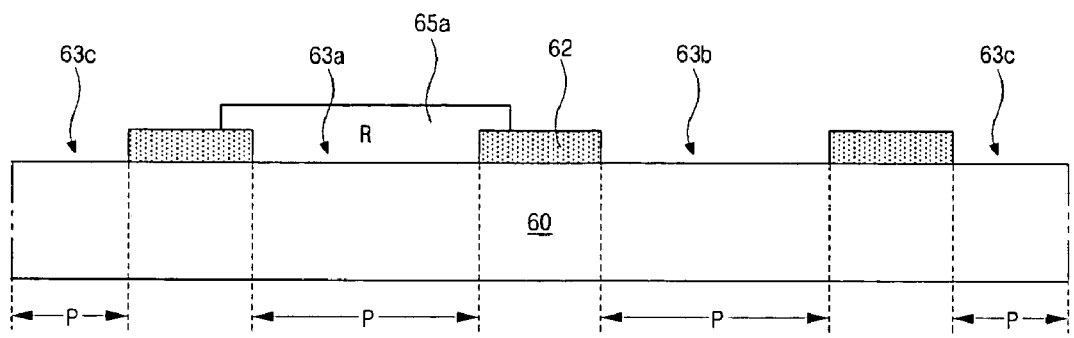
Figure 4D:
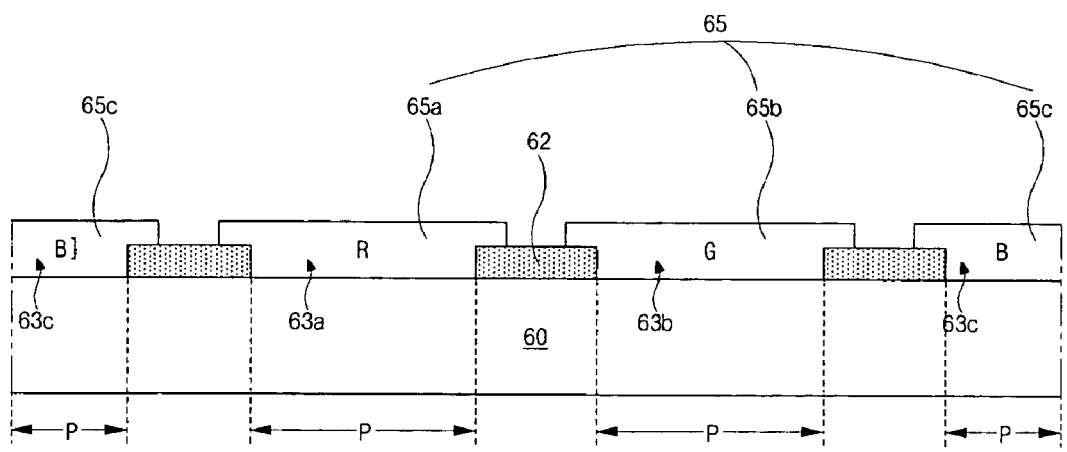
Figure 4E:
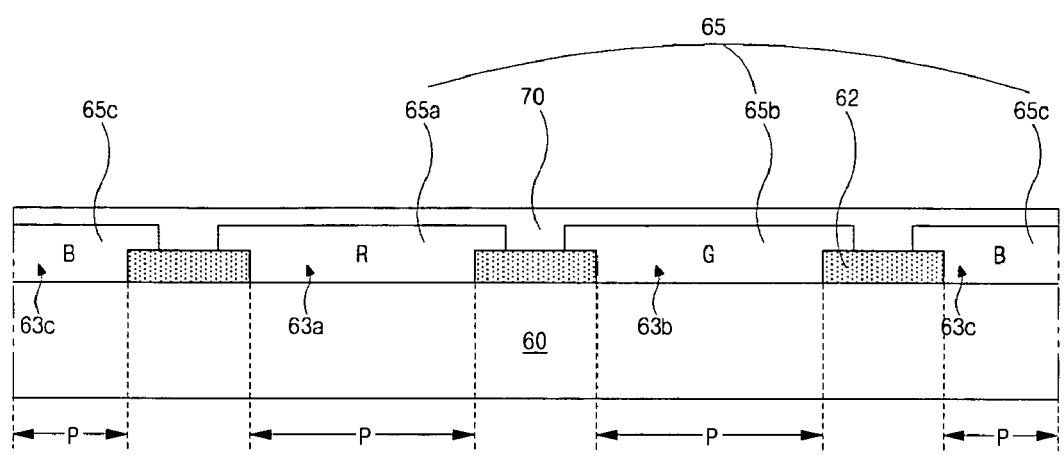
Figure 4F:
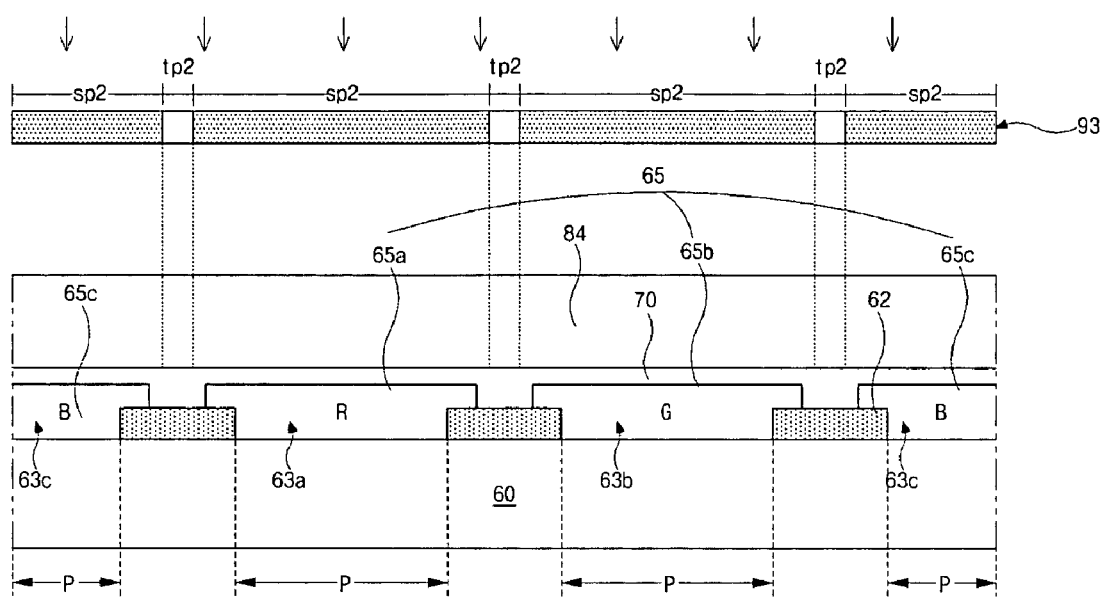
Figure 4G:
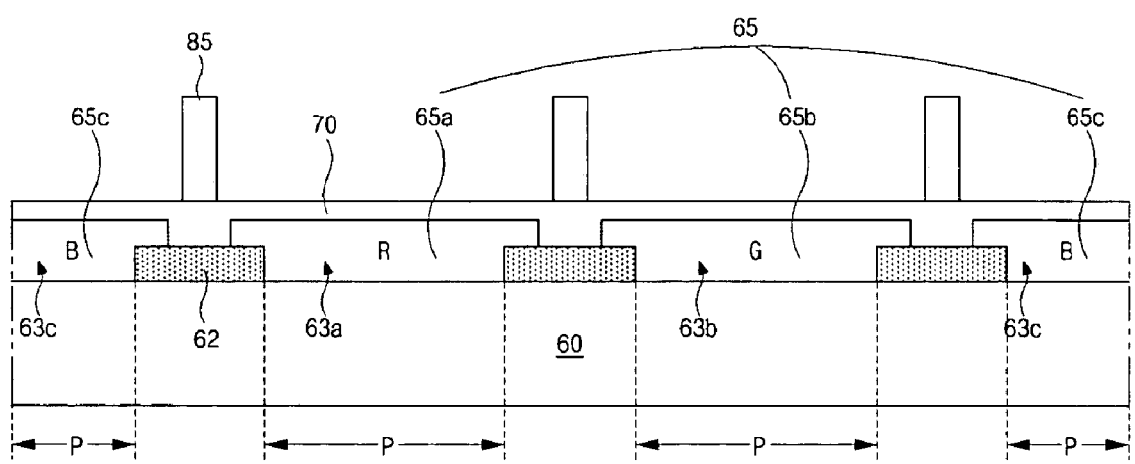
Figure 5A:
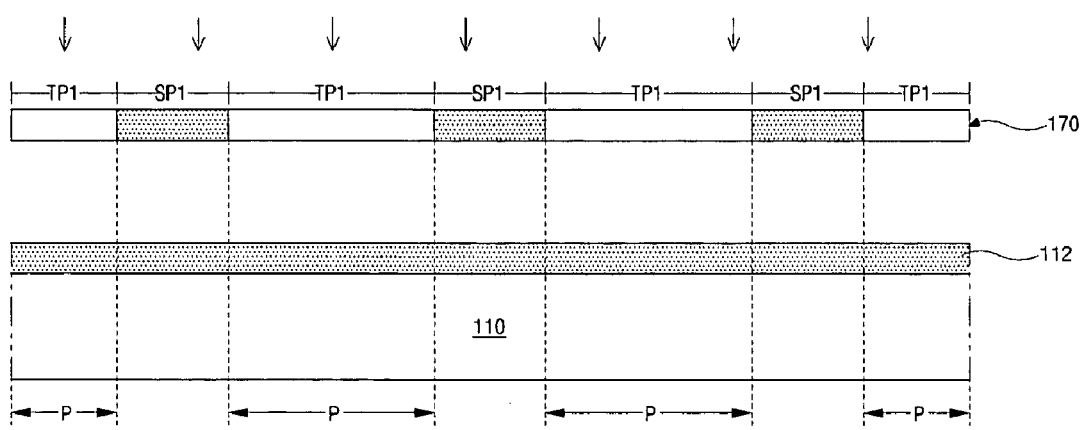
FIG. 5A is a cross section view illustrating an exemplary process for forming and exposing a black matrix layer on a substrate of an LCD device according to an embodiment of the present invention.

FIG. 5A is a cross section view illustrating an exemplary process for forming and exposing a black matrix layer on a substrate of an LCD device according to an embodiment of the present invention. Referring to FIG. 5A, a black matrix material layer 112 is formed by coating a photosensitive material on a substrate 110 including the plurality of pixel regions P. The photosensitive material has a light blocking property. For example, the photosensitive material may include a black resin. In an embodiment of the present invention, the photosensitive material includes a positive type material, an exposed portion of which is removed through a developing process.

Next, a mask 170 is disposed over the substrate 110 including the black matrix material layer 112. The mask 170 includes transmissive portions TP1 and shielding portions SP1 at a boundary of the transmissive portion TP1. Specifically, the mask 170 is spaced apart from the substrate 110, and the transmissive portions TP1 of the mask 170 correspond to the pixel regions P of the substrate 110.

Further, ultra violet (UV) light is irradiated onto the substrate 110 through the mask 170. Thus, only portions of the black matrix material layer 112 corresponding to the transmissive portions TP1 of the mask 170 are exposed. When the black matrix material layer 112 includes a chromium (Cr) material as a basic material, a photoresist is formed after forming the black matrix material layer 112 and before irradiating the UV light over the substrate 110. Forming the photoresist layer is needed because the chromium (Cr) material lacks photosensitivity.

Figure 5B:
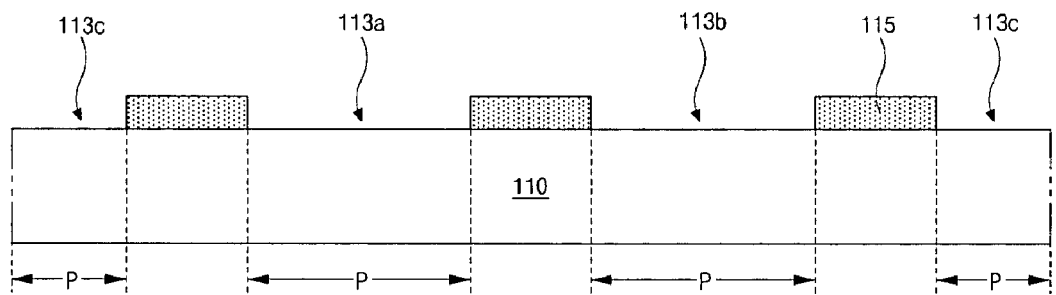
FIG. 5B is a cross section view of an exemplary black matrix patterned layer on a substrate of an LCD device according to an embodiment of the present invention.

FIG. 5B is a cross section view of an exemplary black matrix patterned layer on a substrate of an LCD device according to an embodiment of the present invention. Referring to FIG. 5B, the exposed portions of the black matrix material layer 112 shown in FIG. 5A are removed by a developing process following exposure to the UV light.

Accordingly, the black matrix material layer 112 shown in FIG. 5A is patterned into a black matrix 115.

The black matrix 115 is formed in a boundary region of the pixel regions P and includes first to third open portions 113a, 113b and 113c corresponding to the pixel regions P. The first to third open portions 113a, 113b and 113c correspond to a later-formed red, green and blue filters, respectively.

In another embodiment of the present invention, the black matrix 115 can be formed with a negative type material rather than a positive type material. Although not shown in the drawings, when forming a negative type black matrix, the transmissive and shielding portions are switched from their respective positions with regard to the positive type mask. Accordingly, the mask associated with the negative type material includes shielding portions corresponding to the pixel regions P and transmissive portions in the boundary region of the shielding portions.

Figure 5C:
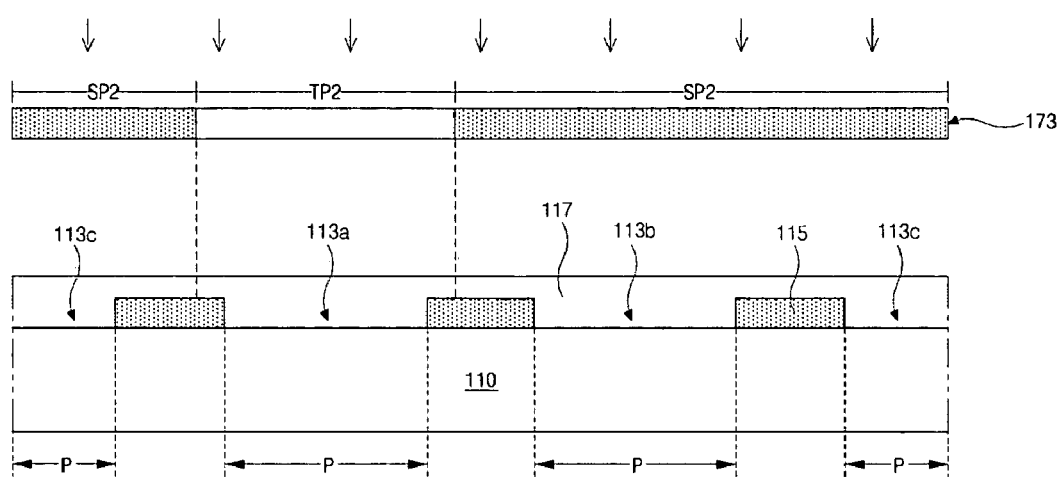
FIG. 5C is a cross section view illustrating an exemplary process for forming and exposing a red layer on a substrate of an LCD device according to an embodiment of the present invention.

FIG. 5C is a cross section view illustrating an exemplary process for forming and exposing a red layer on a substrate of an LCD device according to an embodiment of the present invention. Referring to FIG. 5C, a red resist layer 117 is formed by coating a red resist material over an entire surface of the substrate 110 including the black matrix 115. A mask 173 having transmissive portions TP2 and shielding portions SP2 is disposed over the substrate 110 including the red resist layer 117. Thus, a portion of the red resist layer 117 corresponding to the transmissive portions TP2 of the mask 173 is exposed to UV light through the mask 173.

As shown in FIG. 5C, the mask 173 is spaced apart from the substrate 110. The transmissive portion TP2 of the mask 173 corresponds to the first open portion 113a of the black matrix 115. The shielding portion SP2 of the mask 173 is located in a periphery of the transmissive portion TP2. The transmissive portion TP2 of the mask 173 may overlap edges of the black matrix 115 to improve an image quality.

Figure 5D:
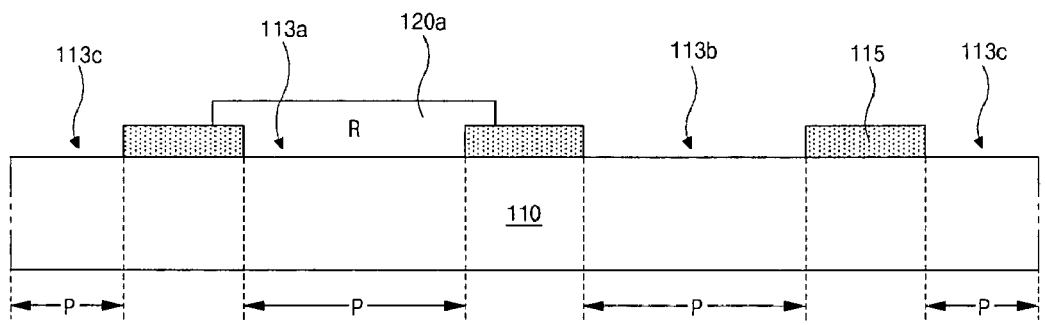
FIG. 5D is a cross section view of an exemplary red filter pattern on a substrate of an LCD device according to an embodiment of the present invention.
Figure 5E:
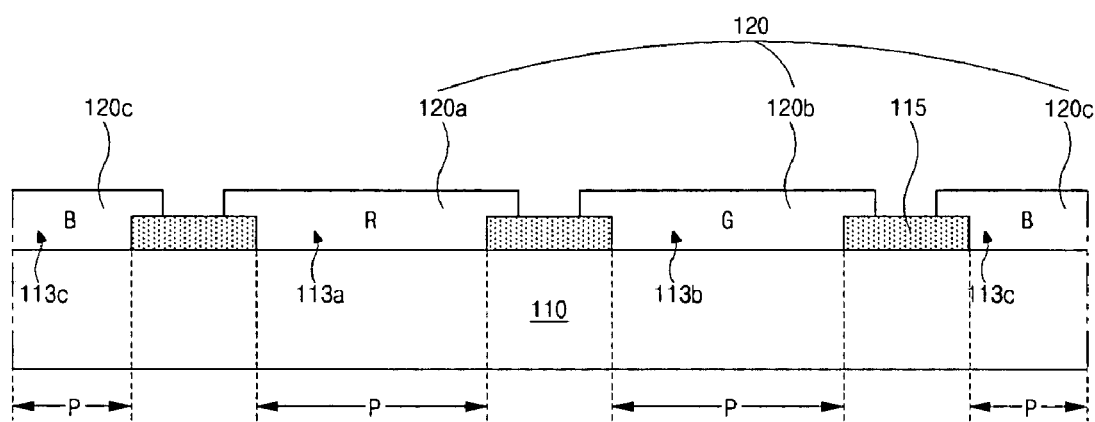
FIG. 5E is a cross section view of exemplary green and blue filter patterns on a substrate of an LCD device according to an embodiment of the present invention.

FIG. 5D is a cross section view of an exemplary red filter pattern on a substrate of an LCD device according to an embodiment of the present invention. Referring to FIG. 5D, the exposed portion of the red resist layer 117 shown in FIG. 5C is patterned into a red filter 120a by the developing process. The red filter 120a is formed in the first open portion 113a of the black matrix 15. Furthermore, the red filter 120a overlaps the edge of an adjacent black matrix 115 as shown in FIG. 5D. Although not shown, more than one red filter 120a may be formed on the substrate 110 including the black matrix 115 and may be spaced apart from an adjacent red filter 120a (not shown). Furthermore, the red filter 120a may be formed as an island pattern structure in a pixel region P. Alternatively, the red filter 120a may be formed as a stripe pattern such that color filters in the same direction form a single body;

FIG. 5E is a cross section view of exemplary green and blue filter patterns on a substrate of an LCD device according to an embodiment of the present invention. Referring to FIG. 5E, green and blue filters 120b and 120c are formed by a patterning process, which includes coating green and blue resist materials over the substrate 110 having the red color filter 120a, respectively. The green and blue resist materials are subsequently exposed and developed. The resulting green and blue filters 120b and 120c are located in the second and third open portions 113b and 113c, respectively. The red, green and blue filters 120a, 120b and 120c, respectively, constitute a color filter layer 120.

Figure 5F:
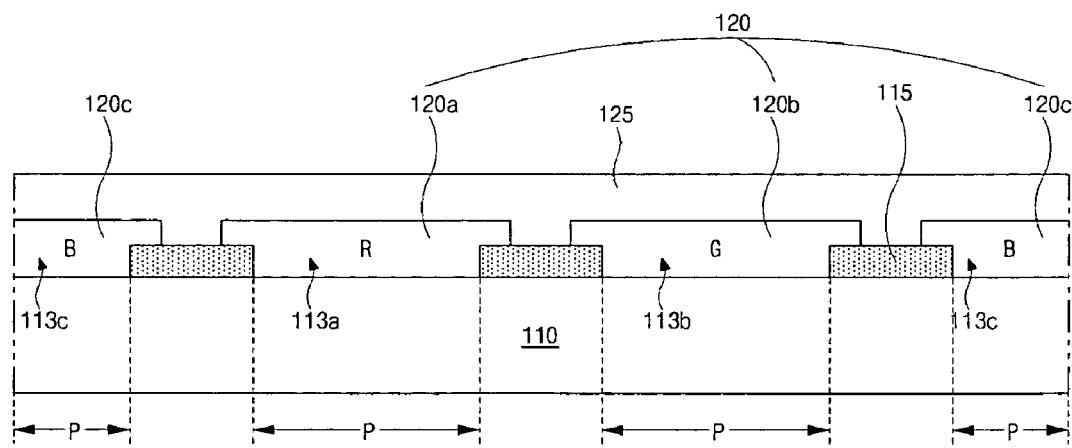
FIG. 5F is a cross section view of an exemplary overcoat layer on a substrate of an LCD device according to an embodiment of the present invention.

FIG. 5F is a cross section view of an exemplary overcoat layer on a substrate of an LCD device according to an embodiment of the present invention. Referring to FIG. 5F, an overcoat layer 125 may be formed by coating an organic material on an entire surface of the color filter layer 120 and portions of the black matrix 115 over the substrate 110. The overcoat layer 125 faces a liquid crystal layer (not shown). The organic material may include a colorless transparent resin. When used, the overcoat layer 125 improves planarization properties of the substrate 110 having the color filter layer 120 and the black matrix 115. Whether the overcoat layer 125 is applied to the color filter substrate is determined by the type of material of the black matrix 115. For example, when the black matrix 115 is formed using an organic material containing carbon (C), the overcoat layer 125 preferably may be formed on the color filter layer 120. However, when the black matrix 115 is formed using a material having chromium (Cr) as a basic material, the overcoat layer 125 may be omitted from the color filter substrate.

Figure 5G:
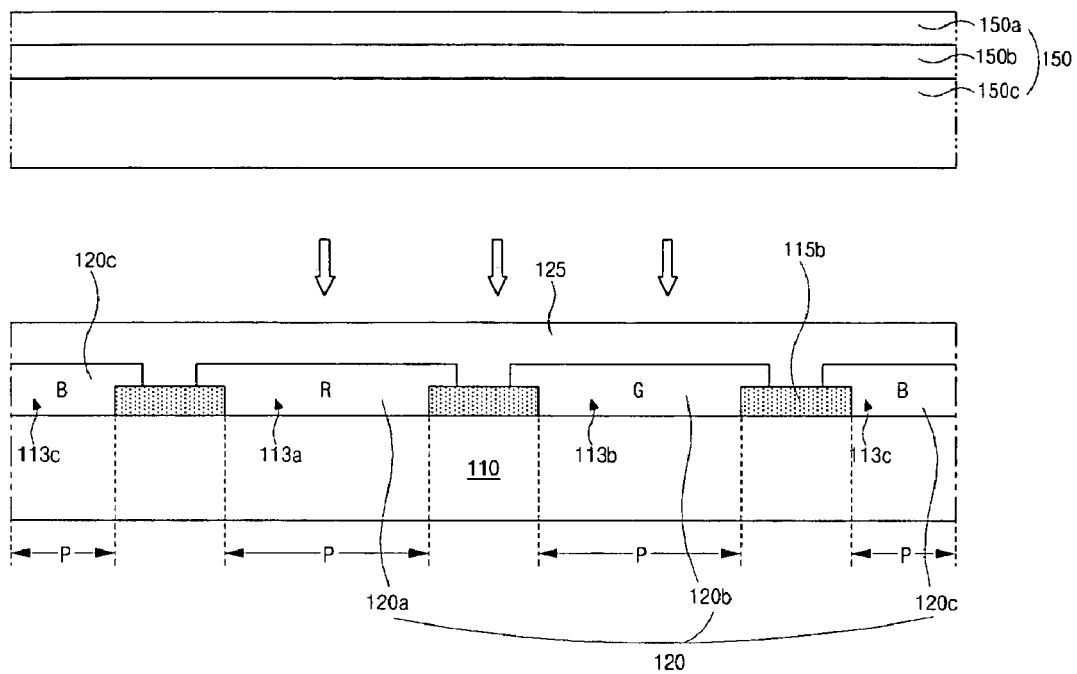
FIG. 5G is a cross section view illustrating an exemplary process for forming a transfer film on a substrate of an LCD device according to an embodiment of the present invention.

FIG. 5G is a cross section view illustrating an exemplary process for forming a transfer film on a substrate of an LCD device according to an embodiment of the present invention. Referring to FIG. 5G, a transfer film 150 is prepared. The transfer film 150 includes a support layer 150a, a conversion layer 150b, and a transfer layer 150c. The conversion layer 150b transforms light energy into heat. The transfer film 150 is attached to the surface of the overcoat layer 125 of the substrate 110 in such a way that the transfer film 150c contacts the surface of the overcoat layer 125.

Figure 6:
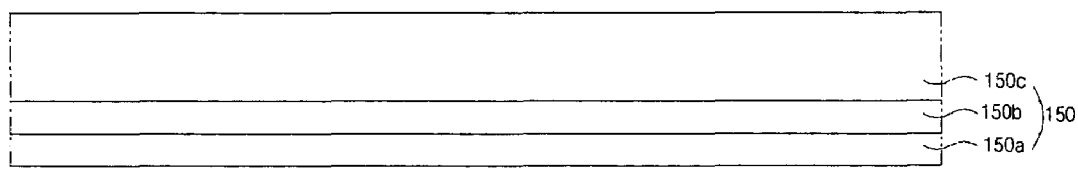
FIG. 6 is a cross section view of an exemplary transfer film according to an embodiment of the present invention.

FIG. 6 is a cross section view of an exemplary transfer film according to an embodiment of the present invention. Referring FIGS. 5G and 6, the support layer 150a includes a highly transparent material, which may be a colorless transparent material such as a polymer material. The support layer 150a supports the conversion layer 150b and transmits irradiated laser light to the conversion layer 150b.

The conversion layer 150b converts light energy into heat. In this regard, the conversion layer 150b may include a material having high heat conversion capability. For example, the conversion layer 150b may include carbon black, a metallic material such as aluminum (Al), an organic compound, a metal oxide material, or a mixture of the foregoing materials.

The transfer layer 150c includes a colorless transparent material having one of benzocyclobutene (BCB), photo acryl, cytop and perfluorocyclobutene (PFCB). The transfer layer 150c can be fixed by the heat generated by the conversion layer 150b. In addition, the transfer layer 150c has a thickness range within about 2 to 8 µm, which corresponds to a uniform cell gap to be maintained between the color filter substrate and an array substrate. Thus, the transfer layer 150c has a thickness range corresponding to the desired cell gap of the LCD device.

Figure 5H:
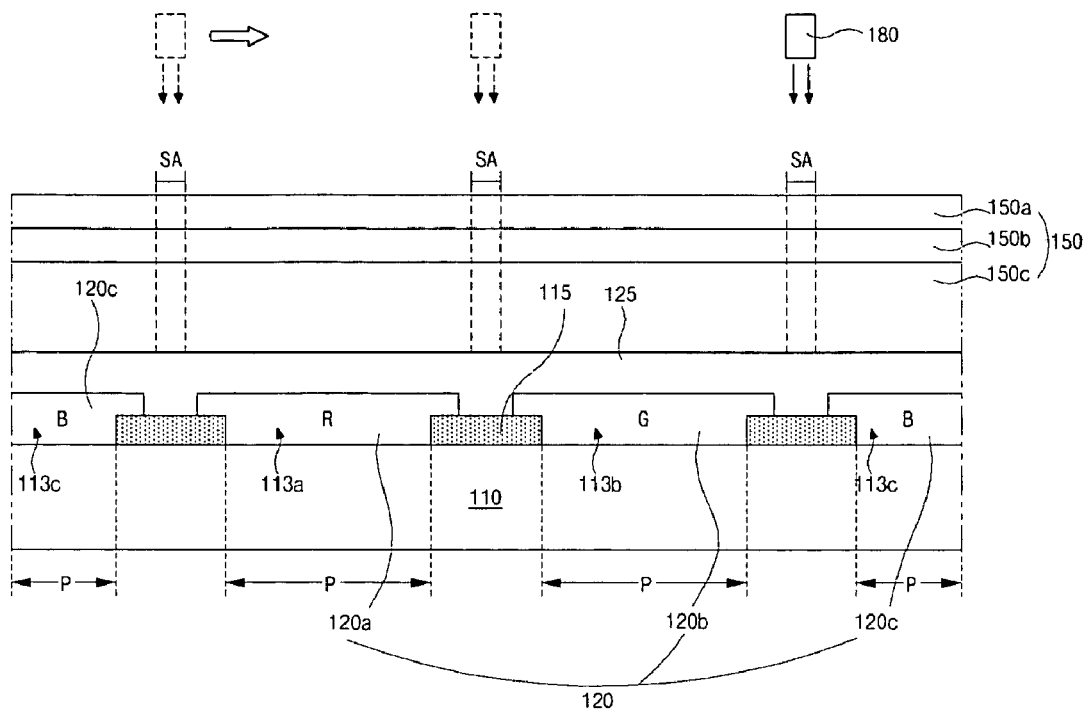
FIG. 5H is a cross section view illustrating an exemplary process for irradiating laser light on a substrate of an LCD device according to an embodiment of present invention.

FIG. 5H is a cross section view illustrating an exemplary process for irradiating laser light on a substrate of an LCD device according to an embodiment of the present invention. Referring to FIG. 5H, a laser head 180 is disposed facing the support layer 150a of the transfer film 150 over the substrate 110. The laser head 180 is spaced apart from the substrate 110 including the transfer film 150. The laser head 180 irradiates laser light onto the support layer 150a of transfer film 150 by performing a rectilinear return movement, for example a reciprocating movement.

Energy from the laser light is absorbed by the irradiated portion of the support layer 150a of the transfer film 150 and is transformed into heat by the conversion layer 150b of the transfer film 150. The heat generated within the conversion layer 150b is supplied to the transfer layer 150c. Therefore, a portion of the transfer layer 150c corresponding to the portion SA is hardened and is fixed to the overcoat layer 125 by the heat supplied by the conversion layer 150b.

The UV light irradiation may be automatically controlled by a computer (not shown) connected to the laser head 180. The computer may control a movement speed of the laser head 180, an irradiation position of the UV light. The computer may also switch the laser light on and off.

In an embodiment of the present invention, the surface of the transfer film is exposed using an ultra violet light through a mask. In this instance, the mask includes a transmissive portion and a shielding portion. The transmissive portion corresponds to a portion of the black matrix.

Figure 5I:
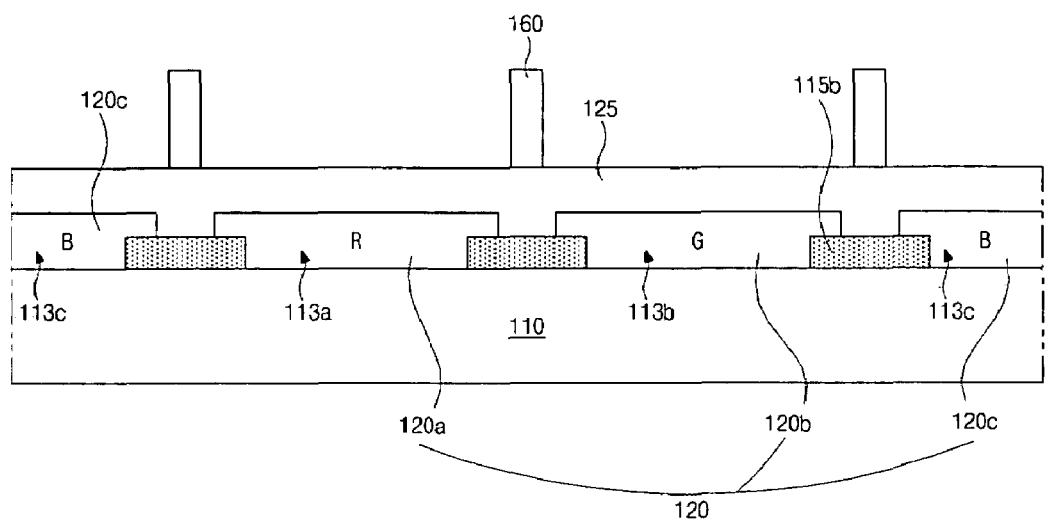
FIG. 5I is a cross section view illustrating an exemplary process for forming pattern spacers on a substrate of an LCD device according to an embodiment of the present invention.

FIG. 5I is a cross section view illustrating an exemplary process for forming pattern spacers on a substrate of an LCD device according to an embodiment of the present invention. As discussed above in reference to FIG. 5H, the hardened portion of the transfer layer 150c, which corresponds to the portion SA irradiated by the laser light, is fixed on the overcoat layer 125 over the substrate 110. Portions of the transfer film 150 (shown in FIG. 5H) is removed except the hardened portion of the transfer layer 150c (also shown in FIG. 5H). The remaining hardened portion of the transfer layer 150c form the patterned spacers 160 on the overcoat layer 125 over the substrate 110.

When a laser beam with a large diameter or any other suitable light source with a large diameter beam is employed, a mask may be used during the exposing or irradiating step.

Figure 7A:
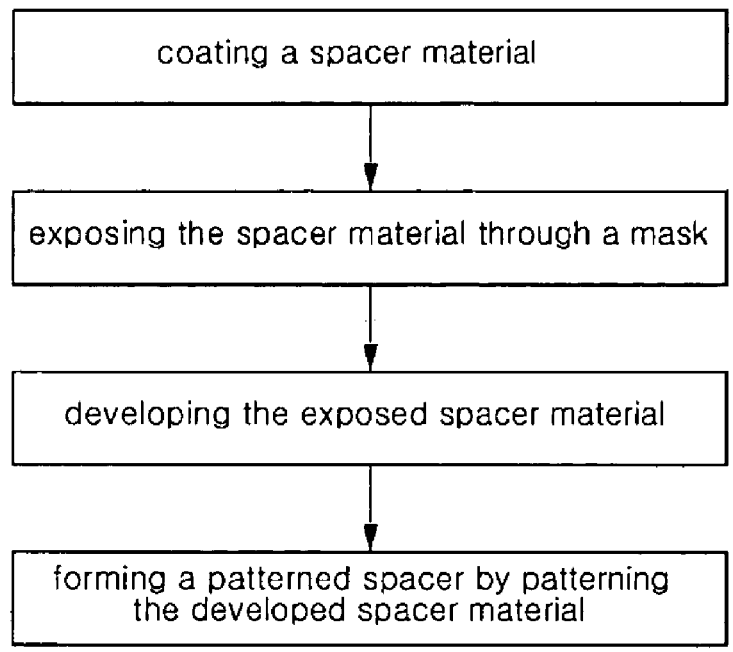
FIG. 7A is a schematic flow chart showing a fabricating method of a patterned spacer on a substrate according to the related art.

FIG. 7A is a schematic flow chart showing a fabricating method of a patterned spacer on a substrate according to the related art. As shown in FIG. 7A, in the related art, forming patterned spacers includes coating a patterned spacer material, exposing the patterned spacer material by a mask having a transmissive portion and a shielding portion, and developing the exposed spacer material to be patterned into the patterned spacer. Thus, the related art patterned spacers should be formed by a mask process including the steps of coating, exposing and developing.

Figure 7B:
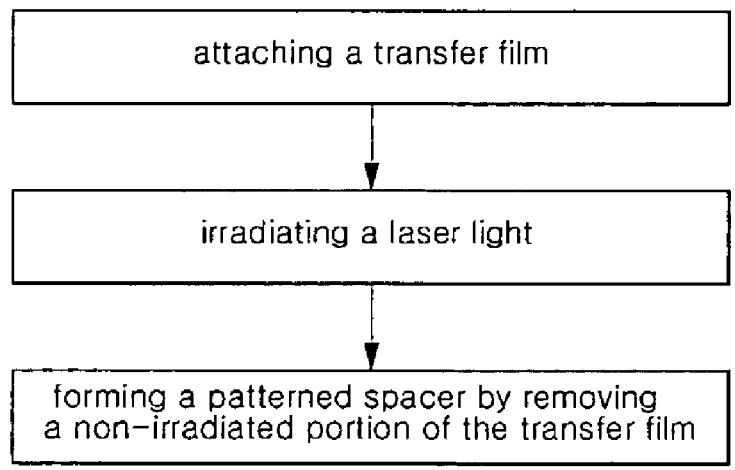
FIG. 7B is a schematic flowing chart showing an exemplary method of fabricating a patterned spacer on a substrate according to the embodiments of the present invention shown in FIGS. 5A to 5I.

FIG. 7B is a schematic flowing chart showing an exemplary method of fabricating a patterned spacer on a substrate according to the embodiments of the present invention shown in FIGS. 5A to 5I. In contrast with the related art, in embodiments of the present invention, a process of forming patterned spacers may be performed by a relatively simple process by attaching a transfer film on the substrate, irradiating laser light onto a portion of the transfer film, removing the non-irradiated portion of the transfer film to leave the fixed portion of the transfer film as the patterned spacer. Thus, the method fabricating patterned spacer according to an embodiment of the present invention may require only about one-third (⅓) of the process time required by the related art, thereby reducing a fabricating time and increasing a productivity.

Figure 8A:
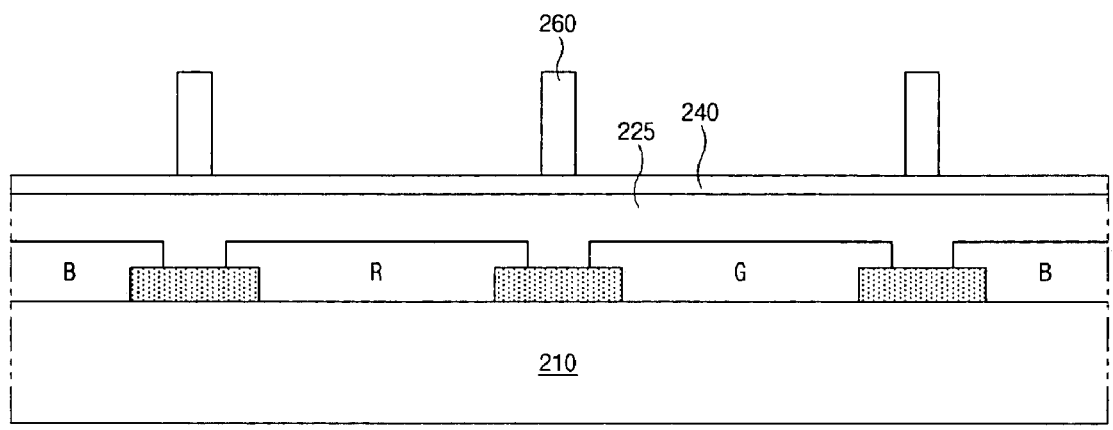
FIG. 8A is a cross section view of an exemplary color filter substrate including a common electrode according to another embodiment of the present invention.

FIG. 8A is a cross section view of an exemplary color filter substrate including a common electrode according to another embodiment of the present invention. Referring to FIG. 8A, a color filter substrate 210 includes a common electrode 240 is formed between the overcoat layer 225 and the patterned spacer 260.

The common electrode 240 can be made of a transparent conductive material, such as one of indium tin oxide (ITO), indium zinc oxide (IZO) and indium tin zinc oxide (ITZO).

Figure 8B:
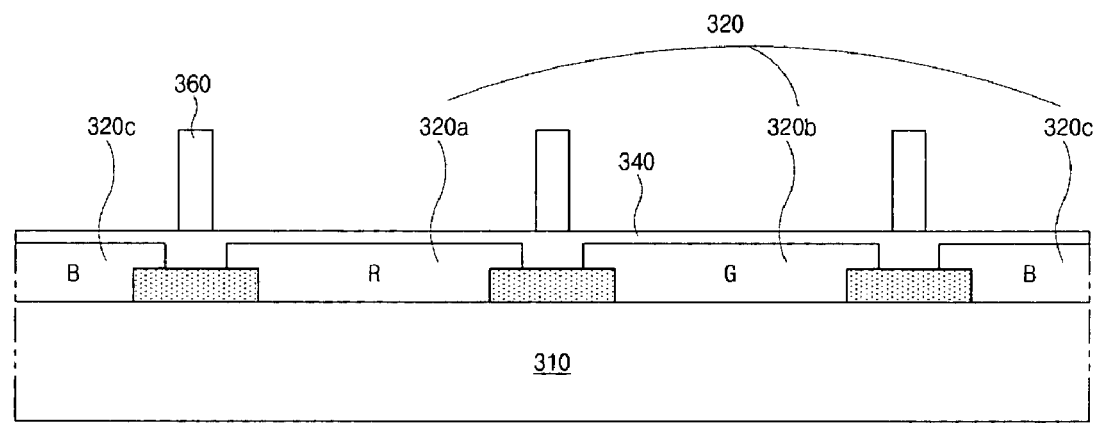
FIG. 8B is a cross section view of an exemplary color filter substrate including a common electrode without an overcoat layer according to another embodiment of the present invention.

FIG. 8B is a cross section view of an exemplary color filter substrate including a common electrode without an overcoat layer according to another embodiment of the present invention. The steps described above in reference to FIGS. 5A to 5I can be applied, so repetitive explanations will be omitted. In addition, referring to FIG. 8B, a common electrode 340 is formed between the color filter layer 320, which inclides red, green and blue filters 320a, 320b and 320c, and the patterned spacers 360 (also shown in FIG. 51).

According to embodiments of the present invention, the exemplary process for manufacturing the color filter substrate for the LCD device only needs four mask processes: one mask process of forming the black matrix, and three mask processes for forming the red, green and blue filters, respectively. The patterned spacer can be formed by applying a transfer process on an exposed portion of a transfer film without an additional mask process, or at least without a developing process as usually included in a mask process. Accordingly, the number of mask processes and the manufacturing cost can be reduced.

It will be apparent to those skilled in the art that various modifications and variations can be made in embodiments of the method of fabricating color filter substrate for liquid crystal display device having patterned spacers of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device including a liquid crystal layer between a first substrate and a second substrate and including a black matrix on an inner surface of one of the first and second substrates, the method comprising:

attaching a transfer film onto a surface of one of the substrates, the transfer film including a transfer material layer contacting the surface;

transferring portions of the transfer material layer to the surface; and removing the transfer film except the transferred portions of the transfer material layer to form patterned spacers, wherein each of the pattern spacers corresponds to the black matrix.

2. The method according to claim 1, wherein transferring the portions of the transfer material layer includes fixing the portions of the transfer material layer to the surface of the substrate of the one of the substrates.

3. The method according to claim 1, wherein transferring the portions of the transfer material layer includes applying heat to the portions of the transfer material layer.

4. The method according to claim 1, wherein the patterned spacers correspond to the transferred portions of the transfer material layer.

5. The method according to claim 1, including:

providing the transfer film with a conversion layer for converting light into heat and for supplying the converted heat to the transfer material layer; and providing the transfer film with a support layer for supporting the conversion layer.

6. The method according to claim 5, further comprising exposing a surface of the transfer film using an ultra violet light through a mask having a transmissive portion and a shielding portion.

7. The method according to claim 6, wherein the transmissive portion of the mask corresponds to a portion of a black matrix.

8. The method according to claim 5, further comprising irradiating a laser light on a portion of the transfer film for forming the patterned spacers.

9. The method according to claim 8, wherein the laser light is irradiated on the portion of the transfer film corresponding to a portion of a black matrix.

10. The method according to claim 8, wherein irradiating the laser light includes performing a rectilinear reciprocating movement with a laser head.

11. The method according to claim 1, wherein a thickness of the transfer material layer corresponds to a cell gap of the liquid crystal display device.

12. The method according to claim 11, wherein the thickness of the transfer material layer is within a range of about 2 to 8 μm.

13. The method according to claim 1, further comprising forming an overcoat layer for improving a planarization on the substrate prior to attaching the transfer film, the transfer film directly contacting the surface of the overcoat layer.

14. The method according to claim 1, further comprising forming a common electrode on the substrate prior to attaching the transfer film, the transfer film directly contacting the surface of the common electrode.

15. The method according to claim 1, wherein the transfer material layer includes a colorless transparent material.

16. The method according to claim 15, wherein the colorless transparent material includes one of benzocyclobutene (BCB), photo acryl, cytop and perfluorocyclobutene (PFCB).

17. A liquid crystal display device fabricated using the method of claim 1, the liquid crystal display device comprising a seal pattern at a periphery of one of the first and second substrates for bonding the first and second substrates to each other.

* * * * *